United States Patent
Iijima (10) Patent No.: US 7,829,235 B2
(45) Date of Patent: Nov. 9, 2010

(54) FUEL CELL PRODUCTION METHOD AND FUEL CELL

(75) Inventor: Masahiko Iijima, Iruma-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 125 days.

(21) Appl. No.: 11/660,041

(22) PCT Filed: Sep. 7, 2005

(86) PCT No.: PCT/IB2005/002650

§ 371 (c)(1),
(2), (4) Date: Feb. 12, 2007

(87) PCT Pub. No.: WO2006/027667

PCT Pub. Date: Mar. 16, 2006

(65) Prior Publication Data

US 2008/0044706 A1    Feb. 21, 2008

(30) Foreign Application Priority Data

Sep. 8, 2004    (JP)  ............................. 2004-260921

(51) Int. Cl.
*H01M 8/10* (2006.01)
*H01M 8/24* (2006.01)

(52) U.S. Cl. .................. 429/465; 429/406; 429/479; 429/535

(58) Field of Classification Search .............. 429/30, 429/405, 465, 479, 535
See application file for complete search history.

(56) References Cited

U.S. PATENT DOCUMENTS

2004/0180252 A1 * 9/2004 Wortman et al. ............... 429/34

2006/0057455 A1    3/2006 Guntow et al.

FOREIGN PATENT DOCUMENTS

| CA | 2483815 A1 * | 11/2003 |
|----|---|---|
| JP | A 63-164174 | 7/1988 |
| JP | 1-302669 | 12/1989 |
| JP | A-04-133266 | 5/1992 |
| JP | A-04-345762 | 12/1992 |
| JP | A 5-89883 | 4/1993 |
| JP | A 9-115542 | 5/1997 |
| JP | A 10-3930 | 1/1998 |
| JP | A-2002-289248 | 10/2002 |
| JP | A 2002-324555 | 11/2002 |
| JP | A 2004-146337 | 5/2004 |
| WO | WO 03/092089 A2 | 11/2003 |

* cited by examiner

OTHER PUBLICATIONS

Notification of Reason(s) for Japanese Patent Application No. 2004-260921; mailed Dec. 15, 2009 (with translation).

*Primary Examiner*—Patrick Ryan
*Assistant Examiner*—Ben Lewis
(74) *Attorney, Agent, or Firm*—Oliff & Berridge, PLC (57) ABSTRACT

First, a solid-state electrolyte layer that has conductivity for ions of one of hydrogen and oxygen is formed. After that, a dense layer made of an electrode material that has electron conductivity, catalyst activity to accelerate the electrochemical reaction, and a characteristic of allowing permeation of ions and/or atoms of the other one of hydrogen and oxygen is formed on a surface of the electrolyte layer. Then, a fuel cell structure that includes the electrolyte layer and the dense layer is built. After that, the electrochemical reaction is caused to progress by supplying a fuel and oxygen to the fuel cell structure, so that in the dense layer, many micropores extending through the dense layer in the film thickness direction are created due to the generated water that is created between the electrolyte layer and the dense layer.

7 Claims, 8 Drawing Sheets

FUEL CELL PRODUCTION METHOD AND FUEL CELL

BACKGROUND OF THE INVENTION

1. Field of the Invention

This invention relates to a fuel cell production method, and a fuel cell.

2. Description of the Related Art

In order to cause electrochemical reactions to progress in a fuel cell, it is important to sufficiently secure places for the electrochemical reactions, specifically, three-phase interfaces that are interfaces among an electrode (catalyst), an electrolyte layer and a space to which reaction gases containing electrode active materials are supplied, and efficiently supply the reaction gases to the three-phase interfaces. In order to secure the three-phase interface and efficiently supply the reaction gases to the three-phase interfaces, the electrodes have been formed of porous materials that have gas permeability.

Furthermore, in causing the electrochemical reactions to progress in a fuel cell, it is important to secure a current collection characteristic of electrodes. That is, it is important to cause efficient exchange of electrons between the electrodes and the electrode active materials at the three-phase interfaces so as to reduce the internal resistance of the fuel cell. For the securement of a current collection characteristic of an electrode, making the entire electrode electrically continuous is effective. For example, Japanese Patent Application Laid-Open Publication No. 2002-324555 discloses a construction in which a mesh-like thin film electrode is fabricated by forming a dense film from an electrode material, and forming countless small pores that extend through the dense film in the direction of thickness by heat-treating the dense film.

However, the production method for the electrode requires a process of heating and, furthermore, a process of joining the obtained mesh-like thin film electrode onto an electrolyte layer, resulting in a complicated production process. Therefore, an easier and more convenient production method for an electrode has been desired.

SUMMARY OF THE INVENTION

It is an object of the invention to easily and conveniently produce an electrode that has both a sufficient porosity and a sufficient current collection characteristic.

In a first aspect of the invention, a production method for a fuel cell has the steps of: (a) forming a solid-state electrolyte layer that has a conductivity for an ion of one of hydrogen and oxygen; (b) forming, on a surface of the electrolyte layer, a dense layer made of an electrode material that has an electron conductivity, a catalyst activity to accelerate the electrochemical reaction, and a characteristic of allowing permeation of an ion and/or an atom of another one of hydrogen and oxygen; (c) building a fuel cell structure that includes the electrolyte layer and the dense layer; and (d) causing the electrochemical reaction to progress by supplying a fuel and oxygen to the fuel cell structure, so that in the dense layer, many micropores extending through the dense layer in a film thickness direction are created due to a generated water that is created between the electrolyte layer and the dense layer.

According to the production method for the fuel cell of the invention constructed as in the above, a dense layer is formed on the electrolyte layer, and the initial electrochemical reaction is carried out in the fuel cell structure that includes the electrolyte layer and the dense layer, whereby a fuel cell having porous electrodes can be completed. Therefore, a fuel cell provided with porous electrodes can be very easily and conveniently produced. Since the electrode is formed by causing formation of many micropores in the dense layer, it is possible to sufficiently secure electrical continuity in the entire electrode formed, and enhance the current collection characteristic of the electrode.

In the first aspect, the dense layer formed in the step (b) may be made of a solid oxide, and may have a film thickness of 10 nm to 200 nm.

If the film thickness of the dense layer is 10 nm or greater as in the foregoing, it becomes possible to secure a denseness of the dense layer made of a solid oxide, and enhance the current collection characteristic of the electrode formed from the dense layer. Furthermore, if the film thickness of the dense layer is 200 nm or less as in the foregoing, it is possible to enhance the efficiency of formation of micropores in the dense layer caused by the water created between the electrolyte and the dense layer in step (d), and thus obtain an electrode that has sufficiently many micropores.

In the first aspect and its related aspect, the step (b) may form the dense layer by a film forming method in which the electrode material is closely adhered to the electrolyte layer at an atomic level.

This construction will increase the portions of contact between the electrolyte layer and the electrode, thereby making it possible to form more three-phase interfaces where the electrochemical reaction progresses. The film forming method in which the electrode material is closely adhered to the electrolyte layer at the atomic level may be selected from, for example, PVD (Physical Vapor Deposition), CVD (Chemical Vapor Deposition), plating, flame spraying, and a sol-gel method.

In an aspect related to the first aspect, the electrolyte layer formed in the step (a) may be a solid oxide having a flat surface.

In the case where the electrolyte layer is formed of a solid oxide that has a flat surface, it generally becomes difficult to secure many portions of contact between the electrolyte layer and the electrode when a porous electrode is formed on the electrolyte layer. Therefore, by forming the dense layer by the film forming method in which the electrode material is closely adhered to the electrolyte layer at the atomic level, it becomes possible to more remarkably obtain the effect of increasing the portions of contact (three-phase interfaces) between the electrolyte layer and the electrode.

In an aspect related to the first aspect, the step (a) may be a step of forming a proton conductive solid oxide as a film on the hydrogen-permeable metal layer. Furthermore, the dense layer may have an oxide ion conductivity and/or an oxygen atom permeability.

In this case, since the electrolyte layer is formed as a film on the metal layer that has hydrogen permeability, the electrolyte layer can be reduced in thickness. Therefore, it is possible to obtain, through an easy and convenient production process, a fuel cell that is a solid electrolyte fuel cell whose operation temperature is lower, and that is provided with a cathode electrode that has an excellent porosity and an excellent current collection characteristic.

In a second aspect of the invention, a production method for an electrolyte-electrode conjugate has the steps of: (a) forming a solid-state electrolyte layer that has a conductivity for an ion of one of hydrogen and oxygen; (b) forming, on a surface of the electrolyte layer, a dense layer made of an electrode material that has an electron conductivity, a catalyst activity to accelerate the electrochemical reaction, and a characteristic of allowing permeation of an ion and/or an atom of another one of hydrogen and oxygen; (c) building a structure that includes the electrolyte layer and the dense layer; and (d) forming a porous electrode from the dense layer by causing the electrochemical reaction to progress by supplying a fuel and oxygen to the fuel cell structure, so that in the dense layer, many micropores extending through the dense layer in a film thickness direction are created due to a generated water that is created between the electrolyte layer and the dense layer in association with the electrochemical reaction.

According to the production method for the electrolyte-electrode conjugate of the invention constructed as in the above, a dense layer is formed on the electrolyte layer, and the initial electrochemical reaction is carried out in the structure that includes the electrolyte layer and the dense layer, whereby an electrolyte-electrode conjugate having a porous electrode can be completed. Therefore, fuel cell-purpose electrodes that are porous can be very easily and conveniently produced. Since the electrode is formed by causing formation of many micropores in the dense layer, it is possible to sufficiently secure electrical continuity in the entire electrode formed, and enhance the current collection characteristic of the electrode.

In a third aspect the invention, a fuel cell has: a solid-state electrolyte layer having a conductivity for an ion of one of hydrogen and oxygen; and a dense layer made of a solid oxide that has an electron conductivity, a catalyst activity to accelerate the electrochemical reaction, and a characteristic of allowing permeation of an ion and/or an atom of another one of hydrogen and oxygen, the dense layer being formed on a surface of the electrolyte layer.

According to the fuel cell of the invention constructed as in the above, if the electrochemical reaction is caused to progress by supplying the predetermined reaction gases to the fuel cell so that the gas that generates ions and/or atoms of the other one of oxygen and hydrogen is supplied onto the dense layer, water is generated between the electrolyte layer and the dense layer in association with the electrochemical reaction. Therefore, due to the generated water W, many micropores extending through the dense layer in the film thickness direction are created, and thus the dense layer can be turned into a porous layer. Hence, if the initial power generation is performed in the fuel cell of the invention, the fuel cell of the invention becomes able to be used as a fuel cell that has a porous electrode.

In the third aspect of the invention, the dense layer may have a film thickness of 10 nm to 200 nm.

In the third aspect and its related aspect, the electrolyte layer may have a proton conductivity, and another surface side of the electrolyte layer may contact the hydrogen-permeable metal layer. The dense layer may have an oxide ion conductivity and/or an oxygen atom permeability.

The invention can also be realized in various forms other than the foregoings. For example, the invention can be realized in a form of a fuel cell produced by the production method for a fuel cell of the invention, or the like.

DETAILED DESCRIPTION OF THE PREFERRED EMBODIMENTS

The preferred embodiments of the invention will next be described on the basis of examples thereof in the following order.

Figure 1:
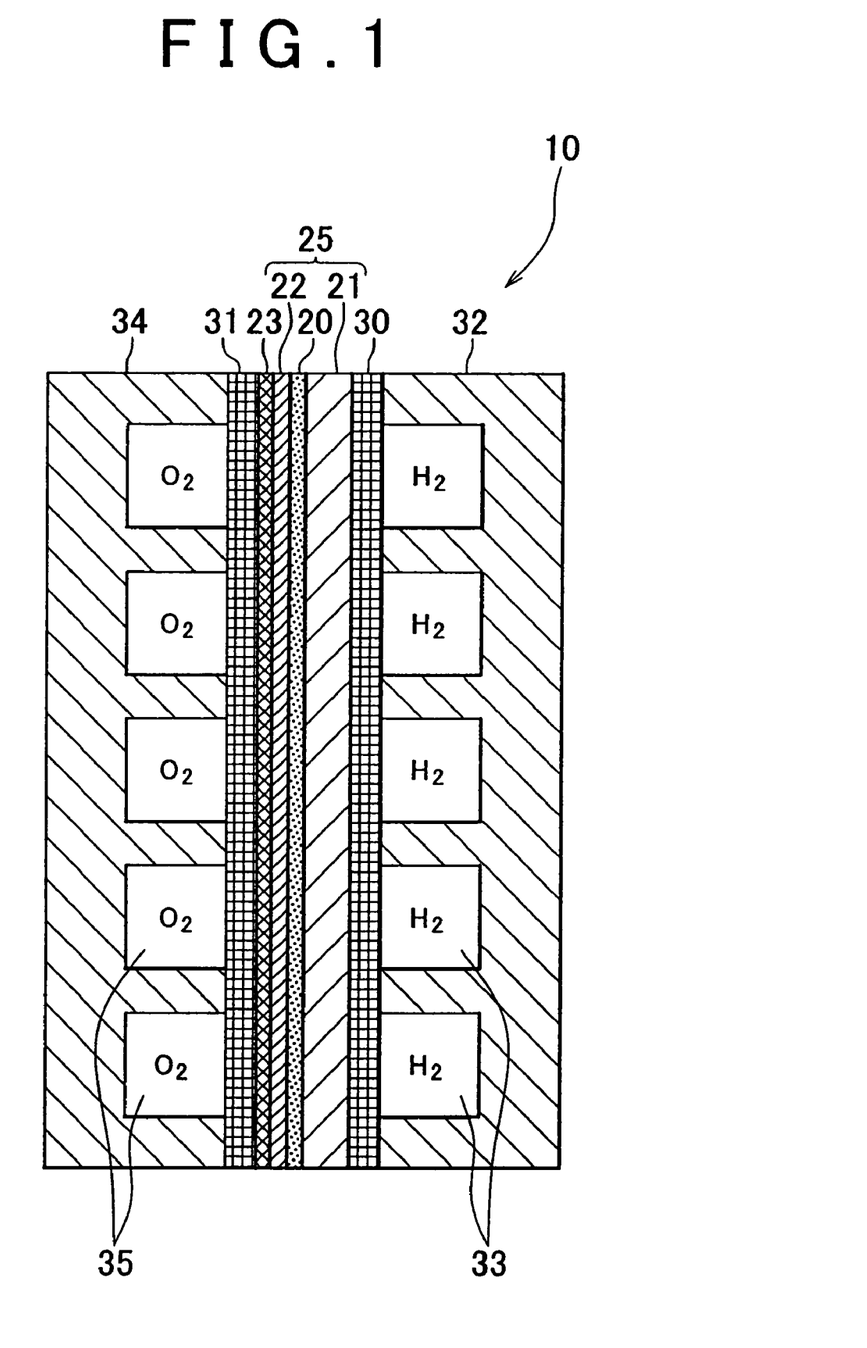
FIG. 1 is a schematic sectional view illustrating the construction of a fuel cell as an embodiment of the invention.

A. Construction of Fuel Cell:

B. Production Method:

C. Modifications:

A. Construction of Fuel Cell:

FIG. 1 is a schematic sectional view illustrating the construction of a fuel cell as an embodiment of the invention. FIG. 1 shows a structure of a single cell 10. A plurality of such single cells 10 are stacked to form a stack structure, thereby forming a fuel cell.

The single cell 10 has an electrolyte layer 20, a hydrogen-permeable metal layer 21, a cathode electrode 22, a particulate cathode layer 23, gas diffusion layers 30, 31, and gas separators 32, 34. The structure formed by sequentially stacking the hydrogen-permeable metal layer 21, the electrolyte layer 20, the cathode electrode 22 and the particulate cathode layer 23 will hereinafter be referred to as "MEA (Membrane Electrode Assembly) 25".

In-single cell fuel gas channels 33 through which a fuel gas containing hydrogen passes are formed between the gas separator 32 and the gas diffusion layer 30 disposed on the hydrogen-permeable metal layer 21. Furthermore, in-single cell oxidizing gas channels 35 through which an oxidizing gas containing oxygen passes are formed between the gas separator 34 and the gas diffusion layer 31 disposed on the particulate cathode layer 23. Although not shown in the drawings, coolant channels through which a coolant passes may be provided in the individual single cell 10 or between the stacked individual single cells 10, in order to adjust the internal temperature of the fuel cell stack.

The hydrogen-permeable metal layer 21 is a layer formed of a metal that has hydrogen permeability. The hydrogen-permeable metal layer 21 can be formed of, for example, palladium (Pd) or a Pd alloy. It is also possible to provide the hydrogen-permeable metal layer 21 as a multilayer film in which a Pd or Pd alloy layer is formed on at least one surface (the surface that contacts the gas diffusion layer 30) of a base formed of a Group V metal, such as vanadium (V) or the like (niobium, tantalum, etc., besides V) or an alloy of a Group V metal. In the hydrogen-permeable metal layer 21, Pd (or a Pd alloy) that constitutes the surface on the gas diffusion layer 30-contact side has activity to dissociate hydrogen molecules when hydrogen passes through the hydrogen-permeable metal layer 21. In the embodiment, the hydrogen-permeable metal layer 21 performs a function as an anode electrode.

The electrolyte layer 20 is formed of a solid electrolyte that has proton conductivity. Examples of the solid electrolyte that constitutes the electrolyte layer 20 include $BaCeO_3$-based ceramics proton conductors, such as $BaCe_{0.8}Y_{0.2}O_3$ and the like, $SrZrYbO_3$-based ceramics proton conductors, and $SrCeO_3$-based ceramics proton conductors. Since the electrolyte layer 20 is formed as a film on the dense hydrogen-permeable metal layer 21, sufficiently thin film formation of the electrolyte layer 20 can be achieved. Therefore, the film resistance of the solid oxide can be reduced, and the fuel cell can be operated at a temperature of about 200 to 600° C. that is below the operating temperature of the solid electrolyte fuel cell. The thickness of the electrolyte layer 20 may be, for example, 0.1 to 5 μm, and may also be appropriately set, taking into consideration the film resistance, the strength, etc.

The cathode electrode 22 is a layer formed as a film on the electrolyte layer 20. The cathode electrode 22 has electron conductivity, catalyst activity to accelerate electrochemical reactions, and oxide ion conductivity. The cathode electrode 22 can be formed of a solid oxide (ceramics) such as $Ba_{0.5}Pr_{0.5}CoO_3$, $La_{0.6}Sr_{0.4}CoO_3$, $La_{0.6}Sr_{0.4}MnO_3$, etc. The cathode electrode 22 is a layer that is electrically continuous, and has many micropores that extend through the cathode electrode 22 in the direction of its thickness. The structure of the cathode electrode 22 and the production method therefor correspond to portions of the invention, and will be described later in detail.

The particulate cathode layer 23 is formed on the cathode electrode 22, and is a porous layer having gas permeability which is provided with fine particles that have electron conductivity. It is appropriate that fine particles constituting the particulate cathode layer 23 have electron conductivity. The particular cathode layer 23 may also be formed of, for example, a material similar to that of the adjacent cathode electrode 22, and furthermore may have oxide ion conductivity and catalyst activity. The particulate cathode layer 23 is a layer for securing electrical connection between the cathode electrode 22 and the gas diffusion layer 31. If the current collection within the single cell 10 is sufficiently carried out, the particulate cathode layer 23 may be omitted.

The gas diffusion layers 30, 31 are members having gas permeability and electrical conductivity, and may be formed of, for example, a carbon member, such as a carbon cloth, a carbon felt, a carbon paper, etc., or a metal member, such as foamed metal, a metal mesh, etc. Each gas diffusion layer 30, 31 diffuses the gas that passes through the in-single cell fuel gas channels 33 or the in-single cell oxidizing gas channels 35, and intervenes between the aforementioned MEA 25 and the gas separator 32, 34 so as to perform current collection. Incidentally, if the current collection is sufficiently carried out within the single cell 10, at least one of the gas diffusion layers 30, 31 may be omitted.

The gas separators 32, 34 are gas-impermeable members formed of an electrically conductive material such as carbon, a metal, etc. A surface of each gas separator 32, 34 has a predetermined projections-and-depressions configuration for forming the in-single cell fuel gas channels 33 or the in-single cell oxidizing gas channels 35.

The fuel gas supplied to the fuel cell may be a hydrogen-rich gas obtained by reforming a hydrocarbon-based fuel, or a hydrogen gas of high purity. The oxidizing gas supplied to the fuel cell may be, for example, air.

Figure 2:
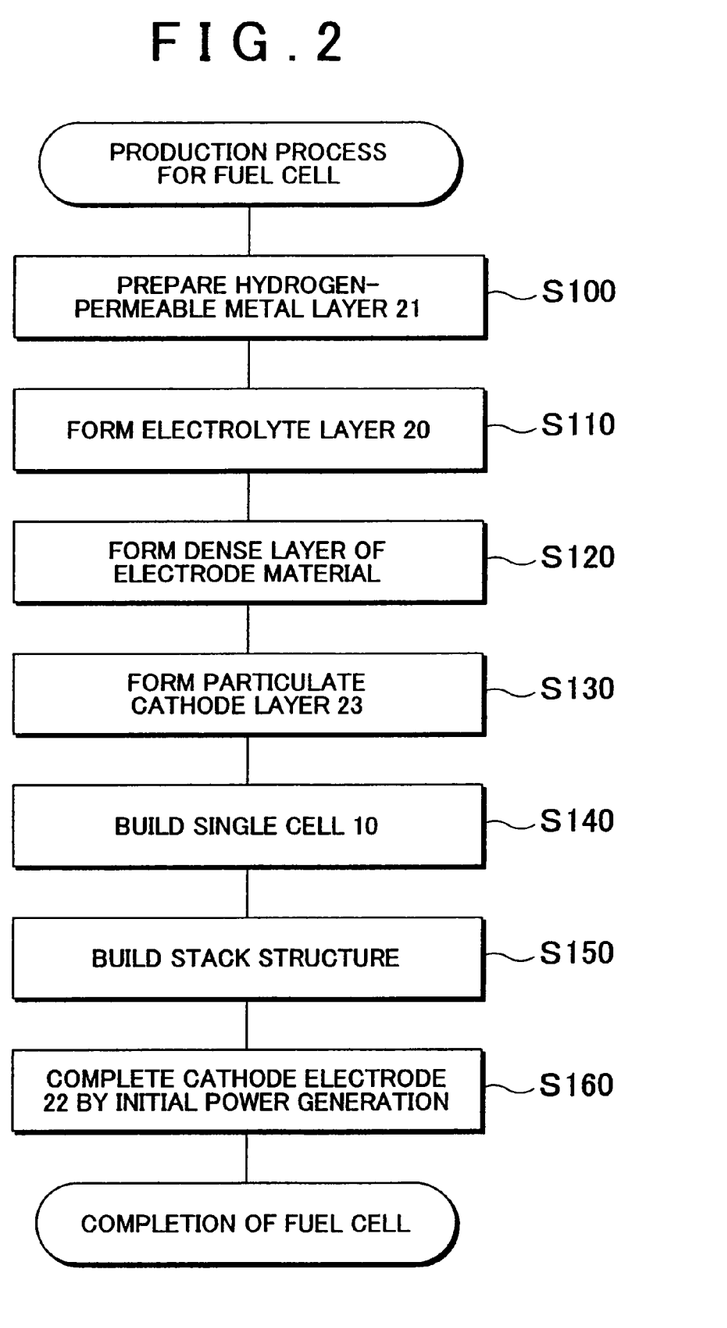
FIG. 2 is an explanatory diagram illustrating a production process for a fuel cell as an embodiment of the invention.

B. Production Method:

Hereinafter, a production process for a fuel cell formed by stacking single cells 10 will be described. FIG. 2 is an explanatory diagram illustrating a production process for a fuel cell as an embodiment of the invention.

When a fuel cell is to be produced, the hydrogen-permeable metal layer 21 is first prepared (step S100). As described above, the hydrogen-permeable metal layer 21 is formed as a metal layer containing Pd, or a metal film in which a layer containing Pd is provided on at least one surface of a base that is a layer that contains a Group V metal. The hydrogen-permeable metal layer 21 may be formed so as to have a thickness of, for example, 10 to 100 μm.

Next, on the hydrogen-permeable metal layer 21 prepared at step S100, the electrolyte layer 20 is formed (step S110). If the hydrogen-permeable metal layer 21 has a structure in which a layer containing Pd is formed on one surface of a base made of a layer that contains a Group V metal, the electrolyte layer 20 is formed on the side of the base made of the Group V metal-containing layer. The electrolyte layer 20 is formed by forming, on the hydrogen-permeable metal layer 21, a film of the aforementioned solid oxide simultaneously with generation of the solid oxide. For example, the electrolyte layer 20 can be formed by PVD (Physical Vapor Deposition), CVD (Chemical Vapor Deposition) or a sol-gel method.

After that, a dense layer 22a formed of an electrode material, such as ceramics mentioned above, which has electron conductivity, catalyst activity to accelerate electrochemical reactions, and oxide ion conductivity is formed on the electrolyte layer 20 (step S120). The dense layer 22a is a layer for forming the cathode electrode 22. A preferable formation method for the dense layer 22a is a method in which an electrode material can be closely adhered to the electrolyte layer 20 at the atomic level. For example, PVD (Physical Vapor Deposition), such as a PLD (Pulsed Laser Deposition) method, sputtering, etc., a CVD (Chemical Vapor Deposition), plating, etc. may be used.

Furthermore, a film formation method, such as flame spraying, in which energy is applied when the electrode material is caused to strike a base (electrolyte layer 20) even in the case of a unit that is larger than atom is similarly able to form a dense layer 22a in which an electrode material is closely adhered to the electrolyte film at the atomic level. Still further, even in the case where the dense layer 22a is formed by a thin film forming method based on a liquid phase, such as a sol-gel method, the electrode material can be closely adhered to the electrolyte layer 20 at the atomic level. Incidentally, the aforementioned ceramics, such as $Ba_{0.5}Pr_{0.5}CoO_3$, $La_{0.6}Sr_{0.4}CoO_3$, $La_{0.6}Sr_{0.4}MnO_3$, etc., used to form the dense layer 22a have activity to generate oxide ions from oxygen, in addition to the foregoing characteristics.

After that, the particulate cathode layer 23 is formed on the dense layer 22a made of an electrode material, whereby the MEA 25 is completed (step S130). The particulate cathode layer 23 can be formed by, for example, performing on the cathode electrode 22 the screen printing with a paste that contains fine particles that have electron conductivity, or applying as a coating a paste that contains the aforementioned fine particles to the cathode electrode 22.

After the MEA 25 is completed, the gas diffusion layers 30, 31 are provided on both sides of the MEA 25, and then the gas separators 32, 34 are provided on the outer sides, thereby building a single cell 10 (step S140). Subsequently, a plurality of single cells 10 are stacked, and the entire structure is held by applying a predetermined pressing force, whereby a fuel cell structure (fuel cell stack) is built (step S150).

After the fuel cell stack is built, a predetermined fuel gas supplying apparatus and a predetermined oxidizing gas supplying apparatus are connected to the fuel cell stack. The fuel gas supplied from the fuel gas supplying apparatus is supplied to the individual in-single cell fuel gas channels 33 formed within the fuel cell stack, and the oxidizing gas supplied from the oxidizing gas supplying apparatus is supplied to the individual in-single cell oxidizing gas channels 35 formed within the fuel cell stack, whereby initial power generation is performed. This power generation is performed in a condition such that in the dense layer 22a, many micropores will be formed extending therethrough in the direction of the film thickness due to the water generated between the electrolyte layer 20 and the dense layer 22a, so that the dense layer 22a fabricated at step S120 turns into a cathode electrode 22 having many micropores. Thus, a fuel cell is completed (step S160).

The action in which the cathode electrode 22 is formed by the initial power generation will be described. The electrochemical reactions that progress during the power generation of the fuel cell are indicated below. The equation (1) represents a reaction on the anode, and the equation (2) represents a reaction on the cathode. In the fuel cell as a whole, the reaction represented by the equation (3) progresses. Thus, when the fuel cell generates power, water is generated on the cathode.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

In step S160, when the supply of the fuel gas and the oxidizing gas to the fuel cell stack starts, the dense layer 22a, having an activity of generating oxide ions from oxygen and an oxide ion conductivity, causes the oxygen in the oxidizing gas to become oxide ions, and causes the oxide ions to be transferred to the boundary between the electrolyte layer 20 and the dense layer 22a.

Since the dense layer 22a also has an activity to accelerate electrochemical reactions, the reaction represented by the equation (2) begins to progress at the boundary surface between the electrolyte layer 20 and the dense layer 22a, using protons that have passed through the electrolyte layer 20. Therefore, water W is generated at the boundary between the electrolyte layer 20 and the dense layer 22a, and the generated water W causes formation of many micropores extending through the dense layer 22a in the direction of the thickness of the dense layer 22a. Thus, a porous cathode electrode 22 is formed.

As for the phenomenon in which many micropores are formed in the dense layer 22a due to the generated water W as stated above, it is considered that the generated water W breaks through the dense layer 22a at least by physical force, though intervention of a chemical action between the generated water W and the dense layer 22a is also conceivable. It is also considered that the process in which the dense layer 22a turns into the porous cathode electrode 22 by the initial power generation is due to the action that the generated water W acts on the dense layer 22a as explained above and, furthermore, the influence that the conditions of performance of power generation of the fuel cell have on the dense layer 22a. Specifically, it is considered that as the dense layer 22a is exposed to a high-temperature oxidizing condition, a phenomenon in which the electrode materials constituting the dense layer 22a aggregate, and such aggregation of the electrode materials contributes to making the dense layer 22a porous.

Figure 3:
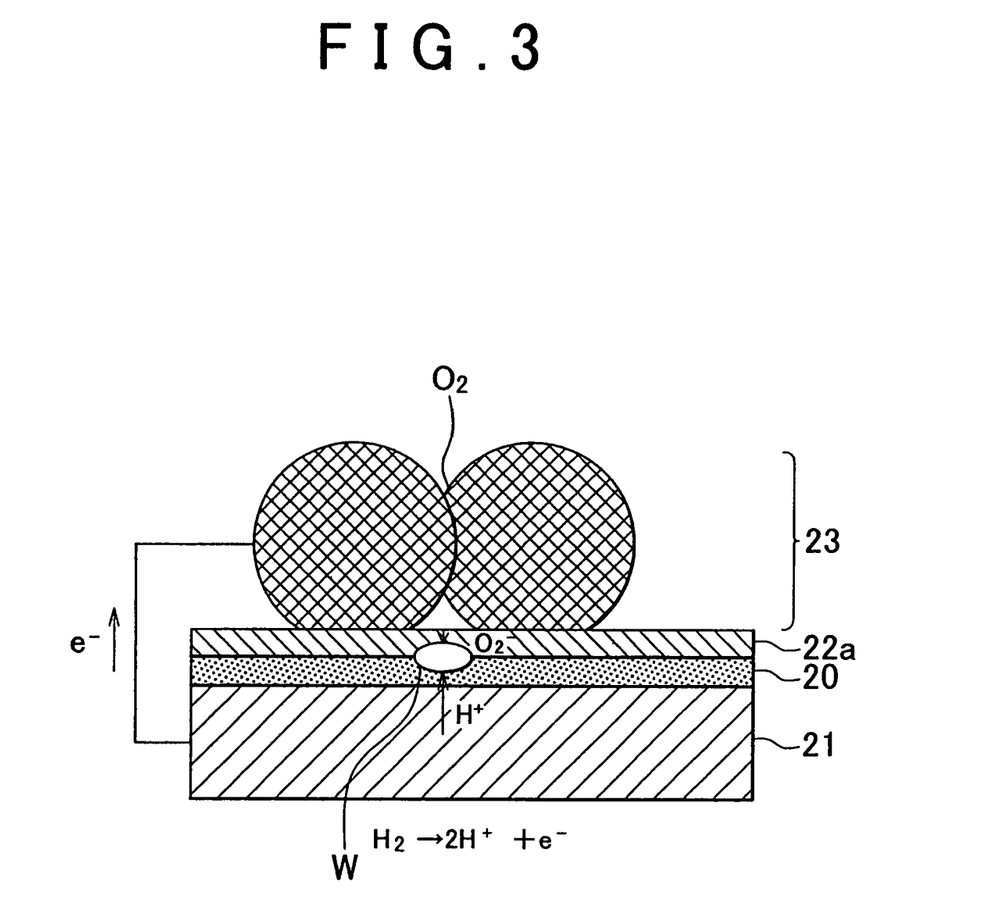
FIG. 3 is an explanatory diagram illustrating an internal appearance of a fuel cell during the initial power generation.
Figure 4:
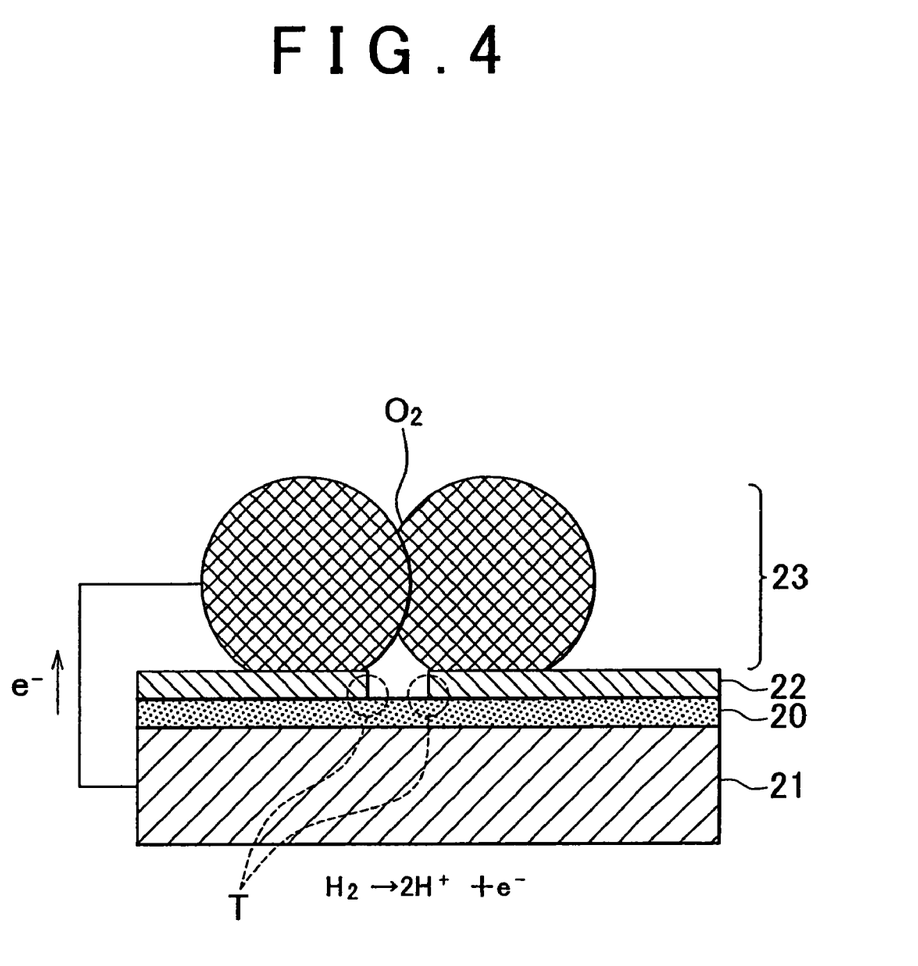
FIG. 4 is an explanatory diagram illustrating an internal appearance of the fuel cell after the initial power generation.

FIG. 3 is an explanatory diagram illustrating an internal appearance of a fuel cell during the initial power generation. FIG. 4 is an explanatory diagram illustrating an internal appearance of the fuel cell after the initial power generation. FIGS. 3 and 4 both schematically show only a section of the MEA 25. Since the generated water W is created between the dense layer 22a and the electrolyte layer 20 as shown in FIG. 3, micropores are formed in the dense layer 22a as shown in FIG. 4. In the thus-formed micropores, three-phase interfaces T are formed at portions of contact with the electrolyte layer 20. After that, the dense layer 22a with the micropores formed serves favorably as the cathode electrode 22. Since the cathode electrode 22 is formed as micropores are created in the dense layer, the cathode electrode 22 as a whole retains the electrically continuous state. Incidentally, in order to make the dense layer 22a sufficiently dense to secure the electrical continuity of the cathode electrode 22, the film thickness of the dense layer 22a formed of a ceramics is desirably greater than 10 nm, and more preferably 15 nm or greater.

The degree of porousness achieved (density of micropores formed) in the cathode electrode 22 by the initial power generation changes depending on the film thickness of the dense layer 22a. If the dense layer 22a is thinner, stabilization occurs in a state where more micropores are formed (a state where more three-phase interfaces T exist). If the dense layer 22a is thicker, stabilization occurs in a state where fewer micropores are formed (a state where fewer three-phase interfaces T exist). In the case where the film thickness of the dense layer 22a is great so that a portion of the generated water W created between the dense layer 22a and the electrolyte layer 20 cannot break through the dense layer 22a at the location of creation, at least a portion of the generated water W is considered to be discharged through micropores formed around the location of creation of the generated water W. Furthermore, portions of the interface between the dense layer 22a and the electrolyte layer 20 where no micropore is formed are considered to cease contributing to the electrochemical reaction, and the oxide ions that have passed through the dense layer 22a (cathode electrode 22) are considered to move to the three-phase interfaces T in micropores formed nearby and react there.

Thus, some time after the initial power generation begins, stabilization occurs (formation of micropores stops) in the dense layer 22a in a state where micropores are formed at a density that corresponds to the film thickness of the dense layer 22a, and thus the cathode electrode 22 is formed. In order to form sufficient three-phase interfaces T, it is desirable that the film thickness of the dense layer 22a be 200 nm or less. That is, it is desirable that the film thickness of the ceramics-made dense layer 22a be 10 nm to 200 nm. Incidentally, such a desirable film thickness of the dense layer 22a slightly varies with the kinds of ceramics constituting the dense layer 22a, and the denseness of the crystal structure (the softness of the dense layer 22a) which is dependent on the production method for the ceramics. The denser the crystal structure of the dense layer 22a is, the more difficult the formation of micropores becomes. Furthermore, if the partial pressure of hydrogen in the fuel gas and the partial pressure of oxygen in the oxidizing gas supplied into the fuel cell stack during the initial power generation are raised to increase the amount of power generation per unit time and therefore enhance the generating rate of the generated water W, more micropores will be formed even in the case of greater film thickness. As the result of ti, the final cell performance can be improved.

According to the production method for a fuel cell in the embodiment of the invention constructed as described above, the cathode electrode 22 is formed by providing the dense layer 22a with micropores, so that good porousness and good electrical continuity of the cathode electrode 22 can both be achieved. That is, since the cathode electrode 22 is made sufficiently porous, it becomes possible to secure three-phase interfaces T, and efficiently supply the oxidizing gas to the three-phase interfaces T. Since electrical continuity is secured in the cathode electrode 22, the internal resistance of the fuel cell can be reduced. This can be accomplished merely by forming the dense layer 22a on the electrolyte layer 20 and performing the initial power generation. Therefore, a special process for fabricating an electrode of a porous material is not necessary, and electrodes having the aforementioned excellent characteristics can be fabricated through very easy and convenient processes.

Furthermore, since the dense layer 22a is formed by a method, such as PVD or the like, in which the electrode material is closely adhered to the electrolyte layer 20 at the atomic level, the area of contact between the electrolyte layer 20 and the cathode electrode 22 can be increased so as to form more three-phase interfaces T. If a smooth-surface solid oxide formed as a film by a method, such as PVD or the like, on the hydrogen-permeable metal layer 21, which is a metal film, is used as an electrolyte layer as shown in FIG. 1, it is generally difficult to closely adhere the electrode material onto the electrolyte layer. For example, in the case of a method in which a porous electrode is fabricated by performing on the electrolyte layer the printing, the application as a coating, or the like, of a paste that contains electrically conductive fine particles, the electrode material particles and the electrolyte layer make point contact on the smooth electrolyte layer, and therefore there is a limit to the securement of three-phase interfaces T. In contrast, in the case where the method in which the electrode material is closely adhered to the electrolyte layer 20 at the atomic level is used, the portion of contact between the cathode electrode 22 and the electrolyte layer 20 becomes greater, and therefore the effect of increasing three-phase interfaces T can be obtained.

Furthermore, since the electrode material and the electrolyte layer 20 are closely adhered to each other at the atomic level, physical force from the generated water W is more effectively applied to the dense layer 22a, so that the efficiency of formation of micropores in the dense layer 22a due to the generated water W during the initial power generation can be raised. As for the method for forming the dense layer 22a, it is also possible to use a method (for example, of printing or applying a paste containing fine particles of the electrode material onto the electrolyte layer) in which the degree of close adhesion between the electrode material and the electrolyte layer 20 is relatively low. Even a method with a relatively low degree of close adhesion can form a sufficiently dense layer if, for example, the concentration of the paste is increased, or the film thickness is sufficiently increased. In the case where the dense layer 22a as described above is made porous by the generated water W that is created during the initial power generation, a similar effect can be achieved, that is, a cathode electrode that has both good electrical continuity and good gas permeability can be fabricated without the need for a complicated process, such as heating or the like.

C. Modifications:

This invention is not limited to the foregoing embodiment, but may be carried out in various manners within a range that does not depart from the sprit of the invention; for example, the following modifications are possible.

C1. Modification 1 (Modification of the Electrode Material):

As for the electrode material for forming the dense layer 22a, various modifications are possible. Although the foregoing ceramics materials, such as $Ba_{0.5}Pr_{0.5}CoO_3$, $La_{0.6}Sr_{0.4}CoO_3$, $La_{0.6}Sr_{0.4}MnO_3$, etc., have electron conductivity, catalyst activity to accelerate electrochemical reactions and oxide ion conductivity, and further have activity to generate oxide ions from oxygen, even a material that does not have sufficient activity to generate oxide ions from oxygen may be used to form the dense layer 22a. In this case, it is appropriate to provide a layer of a material that has activity to generate oxide ions from oxygen (a layer of a noble metal, such as Pt or the like) on the dense layer 22a. It is appropriate that the layer provided on the surface of the dense layer 22a be formed to be sufficiently thin (e.g., as thin as or thinner than 10 nm) so as not to interfere with making the dense layer 22a porous by the generated water W.

The electrode material may also have a characteristic of allowing permeation of oxygen atoms, instead of the oxide ion conductivity or in addition to the oxide ion conductivity. Making the dense layer 22a porous by the generated water W is possible if the dense layer 22a prior to making it porous allows oxygen in the oxidizing gas to permeate as ions and/or atoms to the interface between the dense layer 22a and the electrolyte layer 20, and the electrochemical reaction can progress at the interface.

Furthermore, the dense layer 22a may be formed from an electrode material that is other than ceramics. For example, silver, which is a noble metal and has oxygen permeability, may be used to form the dense layer 22a.

C2. Modification 2 (Modification of Production Process):

In the production process shown in FIG. 2, a fuel cell stack is built with the dense layer 22a incorporated, and the initial power generation of the fuel cell stack is performed so as to make the dense layer 22a porous and therefore form the cathode electrode 22. However, different constructions are also possible. For example, with the dense layer 22a incorporated, a predetermined structure may be built which becomes capable of power generation when the fuel gas and the oxidizing gas are supplied, solely for the purpose of making the dense layer 22a porous. By causing the electrochemical reaction to progress in the structure as mentioned above, an electrolyte-electrode conjugate including the electrolyte layer 20 and the cathode electrode 22 formed by making the dense layer 22a porous can easily and conveniently be produced. In this case, by building a fuel cell stack using electrolyte-electrode conjugates, a fuel cell provided with cathode electrodes 22 that are porous and are good in the electrical continuity, and that form sufficient three-phase interfaces T with the electrolyte layers 20 can be obtained.

C3. Modification 3 (Modification of the Kind of Fuel Cell):

Although in the fuel cell shown in FIG. 1, the electrolyte layer 20 formed on a base is favorably reduced in thickness by using the hydrogen-permeable metal layer 21 as the base, the invention is also applicable to a fuel cell that does not have such a base but is provided with a thicker electrolyte layer of a solid oxide.

Furthermore, the invention may also be applied to the production of other kinds of fuel cells, such as a solid polymer fuel cell that employs a solid polymer film having proton conductivity as an electrolyte layer, a direct methanol fuel cell in which methanol is supplied to the anode side as the fuel gas, etc. In this case, too, a similar effect can be obtained, that is, a cathode electrode that has both good electrical continuity and good gas permeability can be fabricated.

Furthermore, the invention may also be applied to the production of a fuel cell that is provided with an electrolyte layer that has oxide ion conductivity instead of proton conductivity. In this case, the anode electrode can be formed by making the dense layer porous through the use of the generated water W created between the dense layer and the electrolyte layer. For example, a dense layer having proton conductivity, electron conductivity, and catalyst activity to accelerate electrochemical reactions is formed on an electrolyte layer made of an oxide ion-conductive substance, such as yttria-stabilized zirconia (YSZ) or the like. This dense layer can be formed of, for example, a solid oxide, such as tungsten bronze ($H_xWO_3$; $0 \leq X \leq 1$) or the like. If the dense layer is formed so as to have a thickness that is, for example, greater than 10 nm but less than or equal to 200 nm, and the electrochemical reaction is carried out, the dense layer is made porous due to the generated water W created between the dense layer and the electrolyte film, whereby an anode electrode is fabricated.

EXAMPLES

Fuel cells of the first and second samples of the invention, and a fuel cell of a first comparative example were produced, and their cathode electrodes were compared in appearance.

(A) Production of Fuel Cell (A-1) First Sample

The fuel cell of the first sample has a construction similar to that shown in FIG. 1. In the fuel cell of the first sample, a Pd substrate of 80 μm in thickness was used as a hydrogen-permeable metal layer 21. Furthermore, the electrolyte layer 20 was fabricated by forming a layer of $BaCe_{0.8}Y_{0.2}O_3$ of 2 μm in thickness as a film on the hydrogen-permeable metal layer 21 through the PLD method. The dense layer 22a for forming the cathode electrode 22 was fabricated by forming a layer of $La_{0.6}Sr_{0.4}CoO_3$ of 25 nm in thickness as a film on the electrolyte layer 20 through the PLD method. The particulate cathode layer 23 was formed by screen printing through the use of a paste containing fine particles of 0.9 μm in average particle diameter made of the same electrode material ($La_{0.6}Sr_{0.4}CoO_3$) as that of the dense layer 22a.

(A-2) Second Sample

The fuel cell of the second sample has substantially the same construction as the fuel cell of the first sample, and was produced in substantially the same manner. As for the dense layer 22a, however, $Ba_{0.5}Pr_{0.5}CoO_3$ was used as an electrode material, and the thickness thereof was 100 nm. Furthermore, the particulate cathode layer 23 was formed through the use of the same electrode material as the dense layer 22a; specifically, fine particles of $Ba_{0.5}Pr_{0.5}CoO_3$ of 0.9 μm in average particle diameter were used to form the layer 23.

(A-3) First Comparative Example

The fuel cell of the first comparative example has substantially the same construction as the fuel cell of the second sample. However, a particulate cathode layer 23 was formed of $Ba_{0.5}Pr_{0.5}CoO_3$ as an electrode material on the electrolyte layer 20, without forming the dense layer 22a that would later be turned into the cathode electrode 22.

(B) Checking of Three-Phase Interfaces T

Figure 5A:
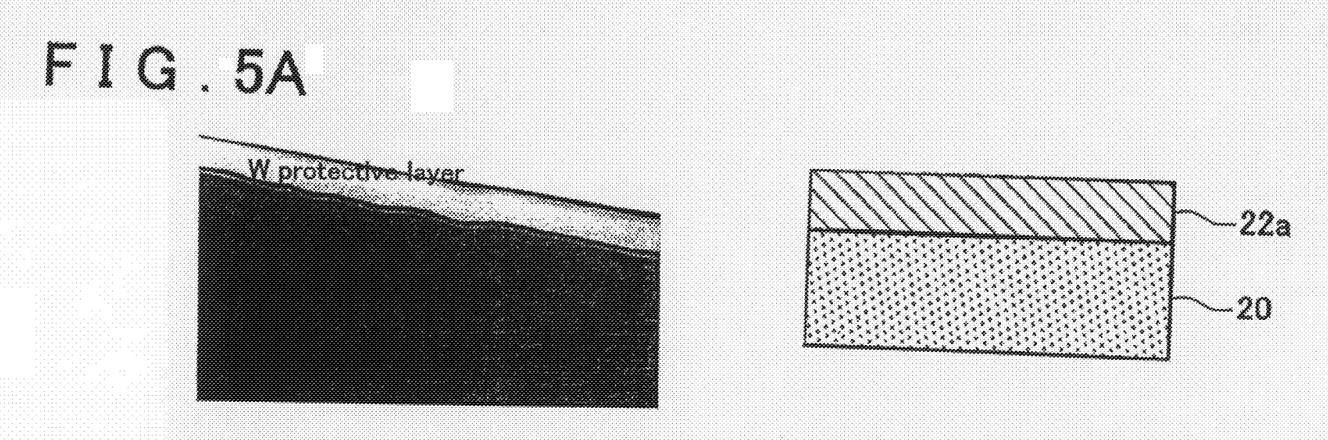
FIGS. 5A and 5B are TEM observation photographs of an appearance of a cathode electrode 22 in a fuel cell in a first embodiment.

FIGS. 5A to 7 are photographs showing results of TEM (transmission electron microscope) observation of the appearances of the cathode electrodes of the first and second samples and the first comparative examples, and all show the appearances of sections thereof. In FIGS. 5A and 5B, photographs are accompanied with schematic diagrams corresponding to the photographs.

FIG. 5A shows the appearance of a section of the fuel cell of the first embodiment at a stage where the dense layer 22a was formed on the electrolyte layer 20, that is, the appearance thereof prior to the power generation. It is confirmed that the dense layer 22a was a dense layer not having micropores. Incidentally, the W protective layer P is a tungsten layer that was provided for the purpose of protecting the state of the section of the specimen when the specimen was cut for observation of the section of the specimen, and that is not provided in real fuel cells.

Figure 5B:
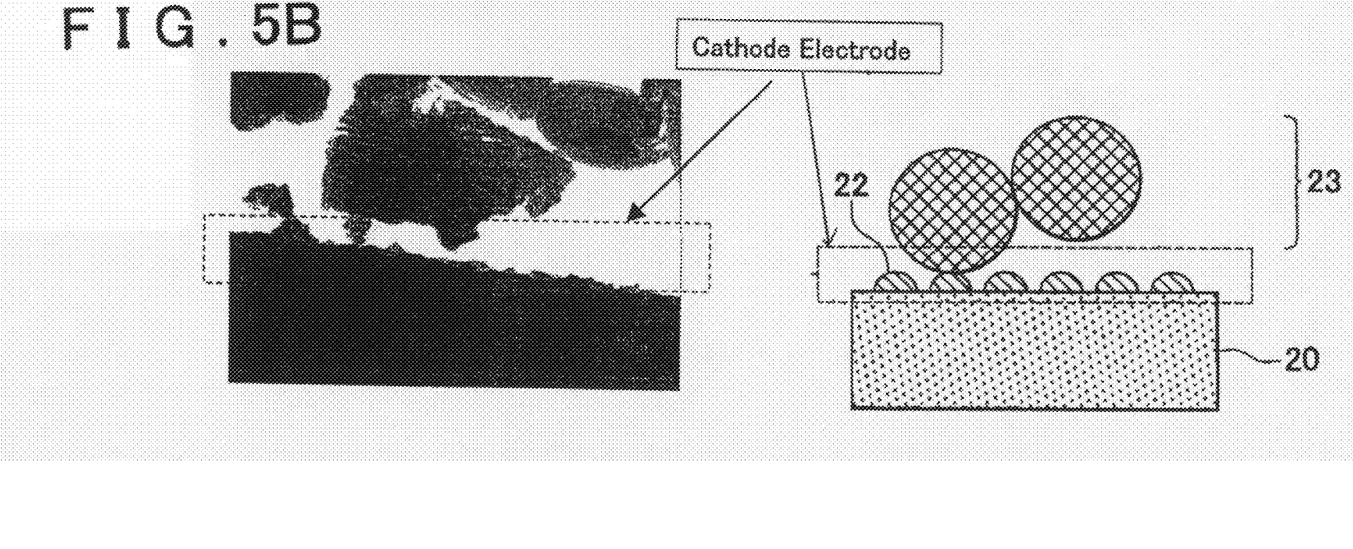

FIG. 5B shows the appearance of the cathode electrode 22 and its vicinity in the fuel cell of the first sample after performance of the initial power generation. It is confirmed that the dense layer 22a was made porous, and thus turned into the cathode electrode 22 forming many three-phase interfaces T.

Figure 6A:
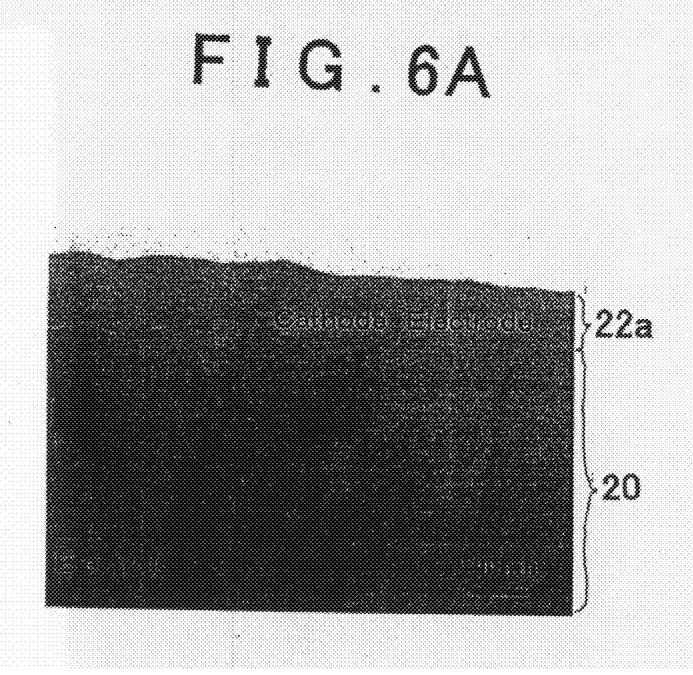
FIGS. 6A and 6B are TEM observation photographs of an appearance of a cathode electrode 22 in a fuel cell in a second embodiment.

FIG. 6A shows the appearance of a section of the fuel cell of the second sample at a stage where the dense layer 22a was formed on the electrolyte layer 20, that is, the appearance thereof prior to the power generation. It is confirmed that the dense layer 22a was a dense layer not having micropores.

Figure 6B:
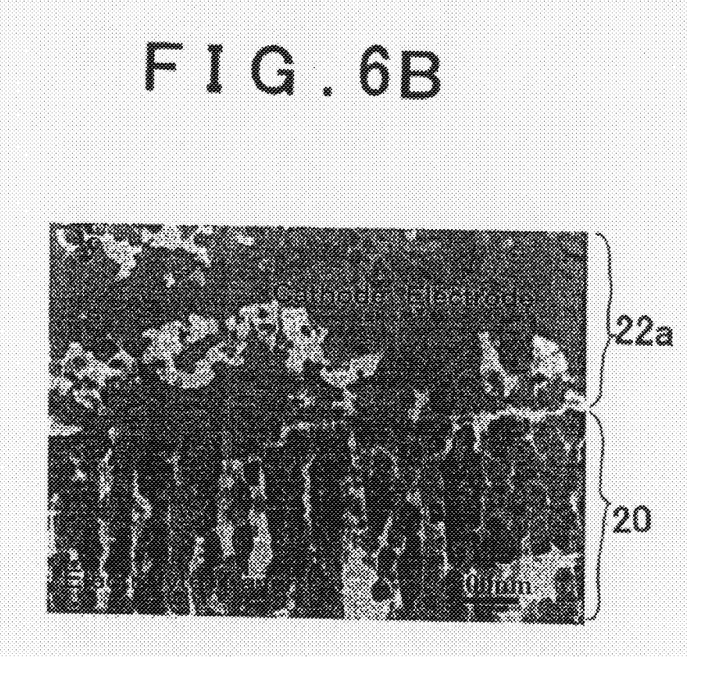

FIG. 6B shows the appearance of the cathode electrode 22 and its vicinity in the fuel cell of the second sample after performance of the initial power generation. It is confirmed that the dense layer 22a was made porous, and thus turned into the cathode electrode 22 forming many three-phase interfaces T. Incidentally, the photograph of FIG. 6B was taken at a higher magnification than the photograph of FIG. 5B. At the same magnification as in FIG. 5B, the cathode electrode 22 in the fuel cell of the second sample allowed recognition of only a few micropores forming three-phase interfaces T. Therefore, the magnification was increased in FIG. 6B to show that the cathode electrode 22 was porous. Thus, through the comparison between the first sample and the second sample, it is confirmed that more micropores forming three-phase interfaces T were formed in the first sample in which the dense layer 22a was thinner.

Figure 7:
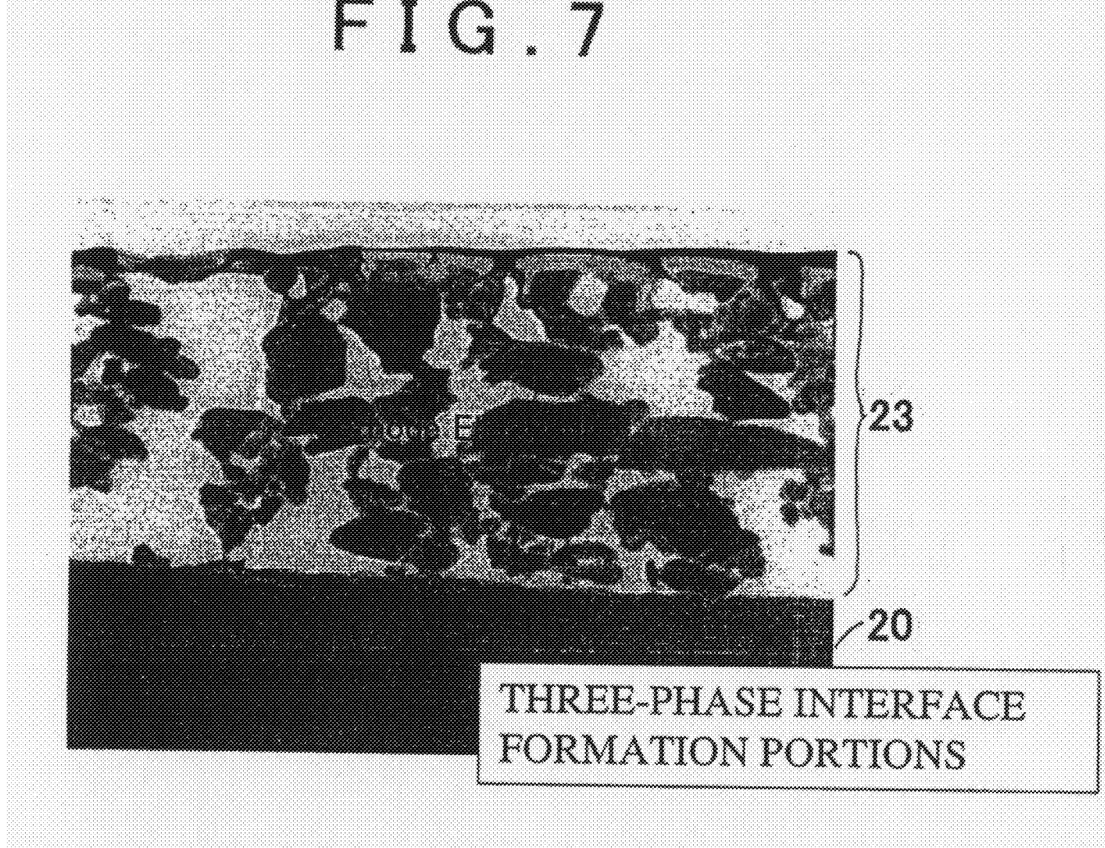
FIG. 7 is a TEM observation photograph of an appearance of an electrode and an electrolyte layer in a fuel cell of a first comparative example.

FIG. 7 shows the appearance of the boundary between the electrolyte layer 20 and the particulate cathode layer 23 and a vicinity of the boundary in the fuel cell of the first comparative example. The photograph of FIG. 7 was taken to show the appearance after performance of the initial power generation as in FIG. 5B and FIG. 6B. Since the fuel cell of the first comparative example did not have a dense layer 22a, the power generation did not make the electrode porous in the first comparative example. The portions of contact between the electrolyte layer 20 and the particulate cathode layer 23, that is, the sites of formation of three-phase interfaces T, are termed three-phase interface formation portions F, and are indicated by arrows in the diagram. It is confirmed that in the fuel cell of the first comparative example, locations of contact between the electrolyte layer 20 and electrode material particles constituting the particulate cathode layer 23 were observed, but the density of three-phase interfaces T formed at the portions of contact between the cathode electrode and the electrolyte layer was lower than in the fuel cells of the first and second embodiments.

(C) Film Thickness of Dense Layer and Cell Performance

Figure 8:
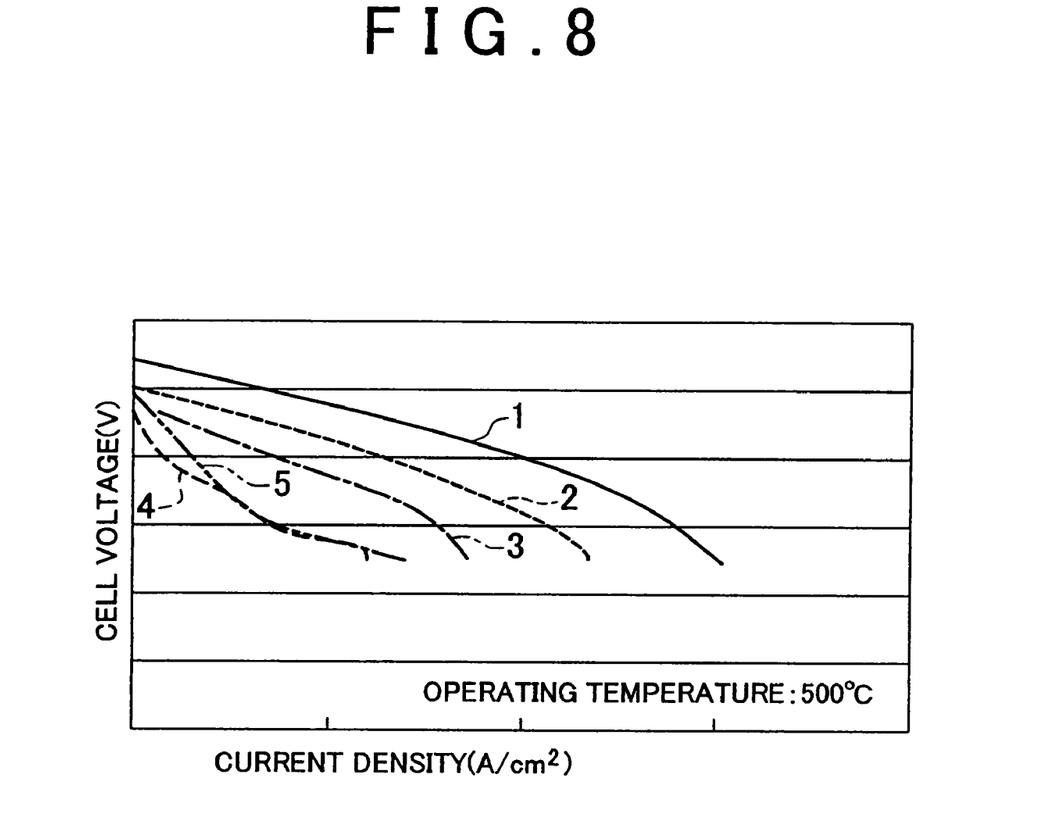
FIG. 8 is an explanatory diagram in which the V-I characteristics of fuel cells different from one another in the film thickness of a cathode electrode 22 are compared.

FIG. 8 is an explanatory diagram indicating an example of results of investigation of the V-I characteristics (output characteristics) of individual fuel cells that were fabricated with variations made in the film thicknesses of the dense layer 22a (cathode electrode 22). In FIG. 8, the horizontal axis represents current density, and the vertical axis represents cell voltage. In the diagram, the graphs 1, 2, 3 and 4 represent results regarding the fuel cells whose dense layers 22a had a film thickness of 25 nm, 50 nm, 100 nm and 200 nm, respectively. It is to be noted that the fuel cell corresponding to the graph 1 employed $La_{0.6}Sr_{0.4}CoO_3$ as an electrode material constituting the dense layer 22a, and was the same as the fuel cell of the first sample. The fuel cells corresponding to the graphs 2 to 4 employed Ba0.5Pr0.5CoO3 as an electrode material constituting their dense layers 22a. That is, the fuel cell whose dense layer 22a had a film thickness of 100 nm, corresponding to the graph 3, was the same as the fuel cell of the second sample. The fuel cell corresponding to the graph 5 was the same as the fuel cell of the first comparative example.

The initial power generation was performed for the individual fuel cells. With respect to the fuel cells corresponding to the graphs 1 to 4, the V-I characteristics thereof were investigated when the state of porousness achieved in the dense layer 22a became stable (after about 10 minutes following the beginning of the initial power generation). Regarding the conditions of the gases supplied to the individual fuel cells, the flow rates of the hydrogen gas supplied to the anode and the air supplied to the cathode were both 200 ml/min, and humidification at 40° C. was performed using a bubbler. The operating temperature of the fuel cells during power generation was set at 500° C.

The fuel cells corresponding to the graphs 1-3, that is, the fuel cells in which the film thickness of the dense layer 22a was 25 nm-100 nm, exhibited better output characteristics than the fuel cell of the first comparative example, and were more excellent in output characteristic if the film thickness thereof was less. The fuel cell corresponding to the graph 4, that is, the fuel cell in which the film thickness of the dense layer 22a was 200 nm, had an output characteristic substantially equivalent to that of the fuel cell of the first comparative example.

As in the above, if the film thickness of the dense layer 22a was within a range such that the electrical continuity of the cathode electrode 22 could be sufficiently secured, the output characteristic of the fuel became more excellent as the dense layer 22a was thinner. It is considered that if the dense layer 22a is thinner, micropores are more readily formed by the initial power generation, so that the degree of porousness of the cathode electrode 22 obtained rises and more three-phase interfaces T are formed. Incidentally, since the degree of formation of micropores in the dense layer 22a changes depending on the conditions at the time of the initial power generation (the amount of power generation per unit time, or the like), it is considered that the output characteristic can be further improved even in the case where the film thickness of the dense layer 22a is 200 nm, by adjusting the conditions at the time of the initial power generation.

First, a solid-state electrolyte layer 22 that has conductivity for ions of one of hydrogen and oxygen is formed. After that, a dense layer 22a made of an electrode material that has electron conductivity, catalyst activity to accelerate the electrochemical reaction, and a characteristic of allowing permeation of ions and/or atoms of the other one of hydrogen and oxygen is formed on a surface of the electrolyte layer 22. Then, a fuel cell structure that includes the electrolyte layer 20 and the dense layer 22a is built. After that, the electrochemical reaction is caused to progress by supplying a fuel and oxygen to the fuel cell structure, so that in the dense layer 22a, many micropores extending through the dense layer 22a in the film thickness direction are created due to the generated water that is created between the electrolyte layer 20 and the dense layer 22a.

The invention claimed is:

1. A production method for a fuel cell that obtains an electromotive force through an electrochemical reaction, comprising the steps of:
   (a) forming a solid-state electrolyte layer that has a conductivity for an ion of one of hydrogen and oxygen;
   (b) forming, on a surface of the electrolyte layer, a dense layer made of an electrode material that has an electron conductivity, a catalyst activity to accelerate the electrochemical reaction, and a characteristic of allowing permeation of an ion and/or an atom of another one of hydrogen and oxygen;
   (c) building a fuel cell structure that includes the electrolyte layer and the dense layer; and
   (d) causing the electrochemical reaction to progress by supplying a fuel and oxygen to the fuel cell structure, so that in the dense layer, many micropores extending through the dense layer in a film thickness direction are created due to a generated water that is created between the electrolyte layer and the dense layer, wherein
   the dense layer has a film thickness of 10 nm to 200 nm, and the dense layer is formed by Physical Vapor Deposition.

2. The production method according to claim 1, wherein the step (b) forms the dense layer in which the electrode material is closely adhered to the electrolyte layer at an atomic level.

3. The production method according to claim 2, wherein the electrolyte layer formed in the step (a) is a solid oxide having a flat surface.

4. The production method according to claim 3, wherein:
   the step (a) is a step of forming a solid oxide as a film on a hydrogen-permeable metal layer; and
   the dense layer has an oxygen atom permeability.

5. A production method for an electrolyte-electrode assembly that constitutes a fuel cell that obtains an electromotive force by electrochemical reaction, comprising the steps of:
   (a) forming a solid-state electrolyte layer that has a conductivity for an ion of one of hydrogen and oxygen;
   (b) forming, on a surface of the electrolyte layer, a dense layer made of an electrode material that has an electron conductivity, a catalyst activity to accelerate the electrochemical reaction, and a characteristic of allowing permeation of an ion and/or an atom of another one of hydrogen and oxygen;
   (c) building a structure that includes the electrolyte layer and the dense layer; and
   (d) forming a porous electrode from the dense layer by causing the electrochemical reaction to progress by supplying a fuel and oxygen to the fuel cell structure, so that in the dense layer, many micropores extending through the dense layer in a film thickness direction are created due to a generated water that is created between the electrolyte layer and the dense layer in association with the electrochemical reaction, wherein
   the dense layer has a film thickness of 10 nm to 200 nm, and the dense layer is formed by Physical Vapor Deposition.

6. A production method for a fuel cell that obtains an electromotive force through an electrochemical reaction, comprising the steps of:
   (a) forming a solid-state electrolyte layer that has a conductivity for an ion of one of hydrogen and oxygen;
   (b) forming, on a surface of the electrolyte layer, a dense layer made of an electrode material that has an electron conductivity, a catalyst activity to accelerate the electrochemical reaction, and a characteristic of allowing permeation of an ion and/or an atom of another one of hydrogen and oxygen;

(c) building a fuel cell structure that includes the electrolyte layer and the dense layer; and
(d) causing the electrochemical reaction to progress by supplying a fuel and oxygen to the fuel cell structure, so that in the dense layer, many micropores extending through the dense layer in a film thickness direction are created due to a generated water that is created between the electrolyte layer and the dense layer, wherein the electrolyte layer has a proton conductivity, the dense layer has an oxide ion conductivity, and a porous cathode electrode is formed from the dense layer by causing the electrochemical reaction.

7. A production method for an electrolyte-electrode assembly that constitutes a fuel cell that obtains an electromotive force by electrochemical reaction, comprising the steps of:
(a) forming a solid-state electrolyte layer that has a conductivity for an ion of one of hydrogen and oxygen;
(b) forming, on a surface of the electrolyte layer, a dense layer made of an electrode material that has an electron conductivity, a catalyst activity to accelerate the electrochemical reaction, and a characteristic of allowing permeation of an ion and/or an atom of another one of hydrogen and oxygen;
(c) building a structure that includes the electrolyte layer and the dense layer; and
(d) forming a porous electrode from the dense layer by causing the electrochemical reaction to progress by supplying a fuel and oxygen to the fuel cell structure, so that in the dense layer, many micropores extending through the dense layer in a film thickness direction are created due to a generated water that is created between the electrolyte layer and the dense layer in association with the electrochemical reaction, wherein the electrolyte layer has a proton conductivity, the dense layer has an oxide ion conductivity, and a porous cathode electrode is formed from the dense layer by causing the electrochemical reaction.

* * * * *